(12) United States Patent
Leroy et al.

(10) Patent No.: US 10,202,150 B2
(45) Date of Patent: Feb. 12, 2019

(54) ROCKERS FOR VEHICLES AND VEHICLES COMPRISING SUCH ROCKERS

(71) Applicant: AUTOTECH ENGINEERING A.I.E., Amorebieta-etxano (ES)

(72) Inventors: Emmanuel Leroy, Verrieres le Buisson (FR); Vincent Barelli, La Ville du Bois (FR)

(73) Assignee: AUTOTECH ENGINEERING A.I.E., Amorebieta-Etxano (ES)

( * ) Notice: Subject to any disclaimer, the term of this patent is extended or adjusted under 35 U.S.C. 154(b) by 0 days.

(21) Appl. No.: 15/550,468

(22) PCT Filed: Mar. 16, 2016

(86) PCT No.: PCT/EP2016/055705
§ 371 (c)(1),
(2) Date: Aug. 11, 2017

(87) PCT Pub. No.: WO2016/146694
PCT Pub. Date: Sep. 22, 2016

(65) Prior Publication Data
US 2018/0022392 A1  Jan. 25, 2018

(30) Foreign Application Priority Data

Mar. 17, 2015 (FR) ..................... 15 52203

(51) Int. Cl.
*B60J 7/00* (2006.01)
*B62D 25/02* (2006.01)
(Continued)

(52) U.S. Cl.
CPC ............ *B62D 25/025* (2013.01); *B60R 3/002* (2013.01); *B62D 21/157* (2013.01); *B62D 25/2036* (2013.01)

(58) Field of Classification Search
CPC ... F01L 1/267; F01L 1/18; F01L 1/181; F01L 1/2411; F01L 13/0036; H01H 23/12; F02B 1/04; F02B 2275/18; F02B 3/06
(Continued)

(56) References Cited

U.S. PATENT DOCUMENTS 8,439,430 B2   5/2013  Sato et al.
9,139,235 B2 *  9/2015  Craig ................... B62D 25/025
(Continued)

FOREIGN PATENT DOCUMENTS

DE    10 2011 051 622 A1   1/2013
EP       0 619 215 A1   10/1994
(Continued)

OTHER PUBLICATIONS

International Search Report and Written Opinion of the International Searching Authority for corresponding International Patent Application No. PCT/EP2016/055705 dated Apr. 26, 2016, 12 pages.

*Primary Examiner* — Kiran B Patel
(74) *Attorney, Agent, or Firm* — Merchant & Gould P.C.

(57) ABSTRACT

A rocker (2) of a vehicle, the vehicle and the rocker (2) comprising a main elongation axis, a width axis (Y) and a height axis (Z), a lower portion and an upper portion, the rocker (2) further comprising a central core (3) comprising a length along the main elongation axis and a height along the height axis (Z); two hollow units (4, 5) extending along the length and on one side and the other of the central core (3), such that one of the units (4) is closer to the outside of the vehicle (1) than the other unit (5), and a cross-section of the units in the main elongation axis, forms a closed polygon on the length of the central core (3); and two flanges (6) projecting from the lower and upper portions of the rocker (2).

12 Claims, 11 Drawing Sheets

(51) Int. Cl.
 B60R 3/00 (2006.01)
 B62D 21/15 (2006.01)
 B62D 25/20 (2006.01)
(58) Field of Classification Search
 USPC .................................................. 296/187.12
 See application file for complete search history.

(56) References Cited

U.S. PATENT DOCUMENTS

| | | | |
|---|---|---|---|
| 9,272,637 B2* | 3/2016 | Han | B62D 25/2036 |
| 2003/0184126 A1 | 10/2003 | Yamazaki et al. | |
| 2012/0261950 A1* | 10/2012 | Balzer | B62D 25/04 |
| | | | 296/193.05 |
| 2013/0049408 A1 | 2/2013 | Kurogi et al. | |
| 2013/0140854 A1 | 6/2013 | Mori | |
| 2014/0327268 A1* | 11/2014 | Mori | B62D 21/157 |
| | | | 296/187.08 |
| 2015/0249240 A1* | 9/2015 | Hihara | B60K 1/04 |
| | | | 180/68.5 |
| 2016/0068196 A1* | 3/2016 | Saeki | B62D 21/157 |
| | | | 296/187.08 |
| 2017/0073012 A1* | 3/2017 | Hyuga | B62D 25/2018 |
| 2017/0088189 A1* | 3/2017 | Saeki | B62D 21/03 |
| 2017/0113728 A1* | 4/2017 | Garay Serrano | B62D 21/157 |
| 2018/0127032 A1* | 5/2018 | Atsumi | B62D 21/157 |
| 2018/0148106 A1* | 5/2018 | Ayukawa | B60L 11/1879 |

FOREIGN PATENT DOCUMENTS

| | | |
|---|---|---|
| FR | 2 909 351 A1 | 6/2008 |
| JP | 2006-264476 A | 10/2006 |
| JP | 2010-137597 A | 6/2010 |
| KR | 100 302 741 B1 | 7/2001 |
| WO | 2012/095991 A1 | 7/2012 |
| WO | 2013/076818 A1 | 5/2013 |

* cited by examiner

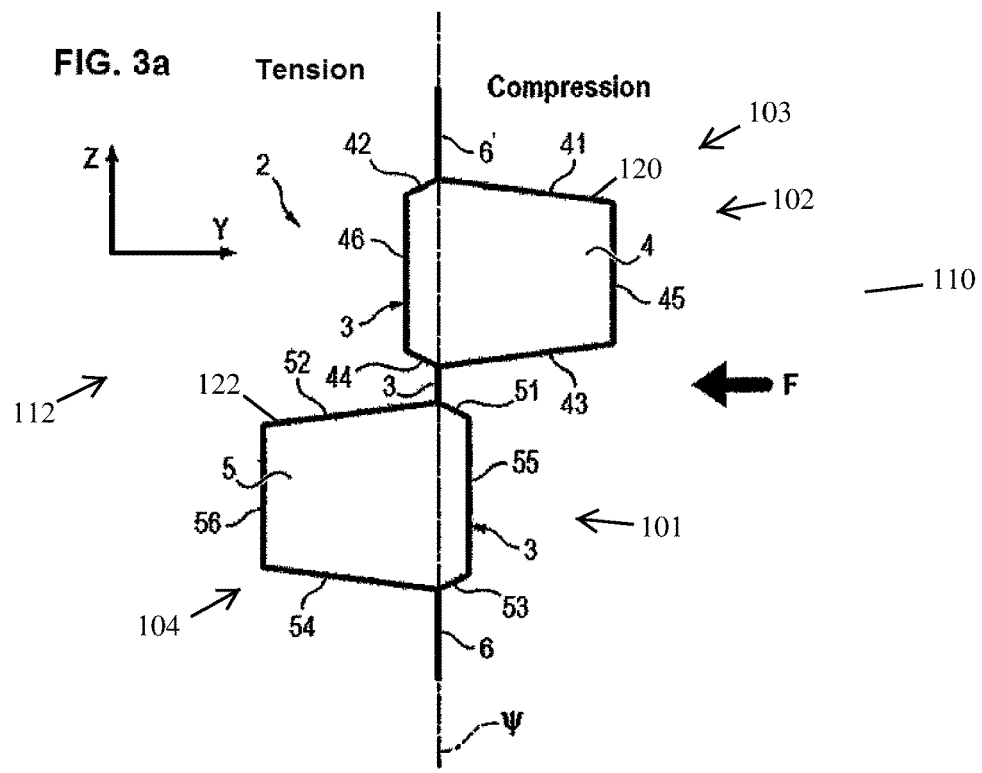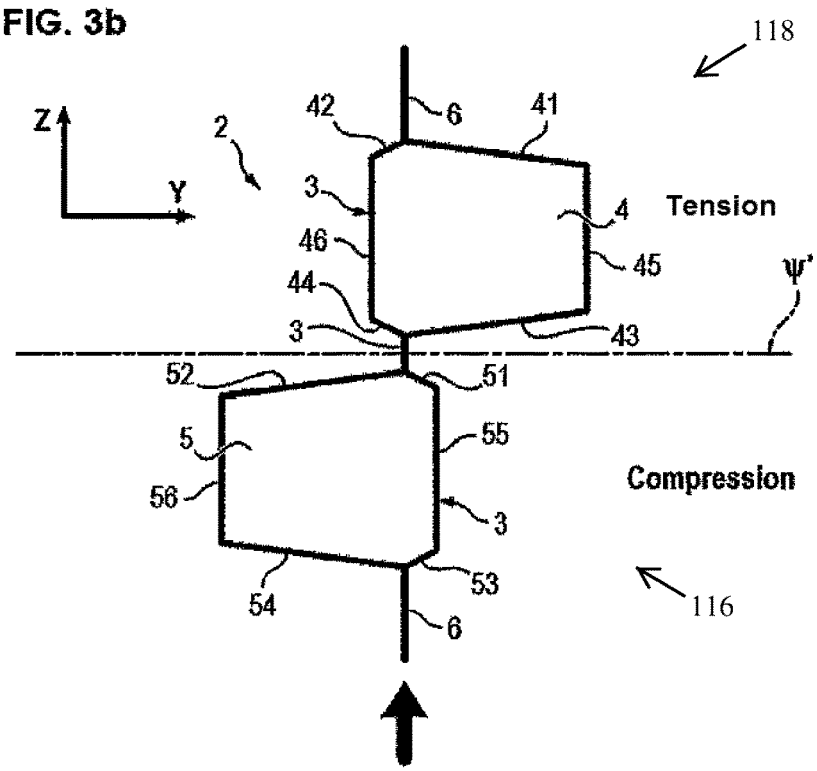

ROCKERS FOR VEHICLES AND VEHICLES COMPRISING SUCH ROCKERS

This application is a National Stage Application of PCT/EP2016/055705 filed on Mar. 16, 2016, which claims the benefit of French Patent Application n° 1552203 filed on Mar. 17, 2015 and which application are incorporated herein by reference. To the extent appropriate, a claim of priority is made to each of the above disclosed applications.

The present disclosure relates to the field of structural parts involved in making vehicle frames, specifically rockers of a vehicle bodywork, as well as vehicles comprising such rockers.

BACKGROUND

The bending strength performances are essential for the side structures of the central underbody of vehicles ("rocker" according to well-known English terminology) in order to ensure the vehicle passengers are protected in the event of side impacts that cause the rockers to bend.

Numerous rockers are known. For example, documents: EP0619215, WO2012095991, US2013/0140854, WO2013/076818 and U.S. Pat. No. 8,439,430.

Nevertheless, none of these documents discloses vehicle underbody structures enabling a satisfactory compromise between bending strength and mass reduction.

There is a need in the market to lower the mass of vehicle frames to an even greater extent in order to reduce fuel consumption, without reducing the mechanical performance of the frame.

The object of the present disclosure is to provide rockers, as well as vehicles comprising such rockers, which improve mechanical performances in terms of bending strength in order to ensure protection for the passengers of a vehicle, whilst having minimum mass to, in particular, ensure optimal performance of the vehicle in terms of fuel consumption.

SUMMARY

The aforementioned aim is achieved according to claim 1.

In a first aspect a vehicle comprising a rocker is provided. The vehicle and the rocker comprise a main elongation axis, a width axis and a height axis, a lower portion and an upper portion. The rocker also comprises a central core comprising a length extending along the main elongation axis and a height extending along the height axis and two hollow units extending along the length of the central core and arranged on one side and the other of the central core such that one of the units is closer to an outside of the vehicle than the other unit and such that a cross-section of the units, in the main elongation axis (X), forms a closed polygon on the length of the central core. The rocker further comprises two flanges projecting from the lower portion and the upper portion of the rocker, wherein the units comprise a height extending along the height axis, and the sum of the height of the two units is not more than the height of the central core that separates the two flanges. The rocker is adapted such that, when it is subjected to bending created by application of a force directed along the width axis or the height axis, it comprises a neutral elongation axis situated between the two units and which delimit a first area of the rocker that is subjected to tension and a second region of the rocker that is subjected to compression. At least 80% of one of the units is situated in the first area and at least 80% of the other unit is situated in the second area. And the unit that is arranged closest to the outside of the vehicle is situated closer to the upper portion of the vehicle than the other unit.

According to this aspect, the fact that a vehicle comprises such a rocker, in particular the fact that a unit that is arranged closest to the outside of the vehicle is situated closer to the upper portion of the vehicle than the other unit, in combination with the other features of the units, enables the maximum bending strength and the energy absorbed to be increased when the rocker is deformed compared to the known structures, with an identical mass. It also enables the penetration of an object colliding laterally against the vehicle to be limited. Moreover, such a rocker is particularly adapted for the bending strength and energy absorption thereof to be maximal in the event that bending is created by the application of a force directed along the width of the vehicle, from the outside towards the inside of the vehicle (typically the lateral collision with another vehicle).

In some examples, the disclosure may further be complemented by the following technical features that may be either taken alone or in any of the possible technical combinations thereof.

In some examples, each unit may comprise a wall that may be transversal to the length of the central core. The wall may be inclined at an angle comprised between 90° and 105° with respect to the height axis.

In some examples, each unit may be formed by assembling reinforcements with the central core. In some of these cases, the reinforcements assembled with the central core may have an elastic limit greater than that of the central core.

In some examples, the rocker may be formed by the assembly of two lateral reinforcements so as to form the central core, the two units and the flanges.

In some examples, the central core may comprise reinforcements so as to be more stiffened. In some of these cases, the central core may comprise a lateral rib situated opposite each of the units along the width axis, the lateral rib may be directed such that it projects opposite the unit.

In some examples, the whole of one unit may be situated in the first area and the whole of the other unit may be situated in the second area.

In some examples, the units may be identical in shape. In others, the units may be different in shape. In more examples, the units may comprise steps or levels.

In a further aspect, the disclosure relates to a rocker of a vehicle substantially as hereinbefore described. The rocker comprises a central core comprising a length extending along the main elongation axis and a height extending along the height axis. The rocker further comprises two hollow units extending along the length of the central core and arranged on one side and the other of the central core such that one unit is closer to the outside of the vehicle than the other unit, and such that a cross-section of the units, in the main elongation axis, forms a closed polygon on the length of the central core. And the rocker further comprises two flanges projecting from the lower portion and the upper portion of the rocker.

BRIEF DESCRIPTION OF THE DRAWINGS

Non-limiting examples of the present disclosure will be described in the following, with reference to the appended drawings, in which:

FIG. 3a shows a cross-sectional view along a main elongation axis of a rocker according to an example on which a force directed along the width axis is applied;

FIG. 3b shows a cross-sectional view along a main elongation axis of a rocker according to an example on which a force directed along the height axis is applied;

FIGS. 15c, 15d, 15e of the rockers of the background; and FIG. 15f of the curves that represent the bending strength created by the application of a force directed along the width axis, as well as the energy absorbed of the different rockers shown in FIGS. 15a-15e.

DETAILED DESCRIPTION OF EXAMPLES

Figure 1:
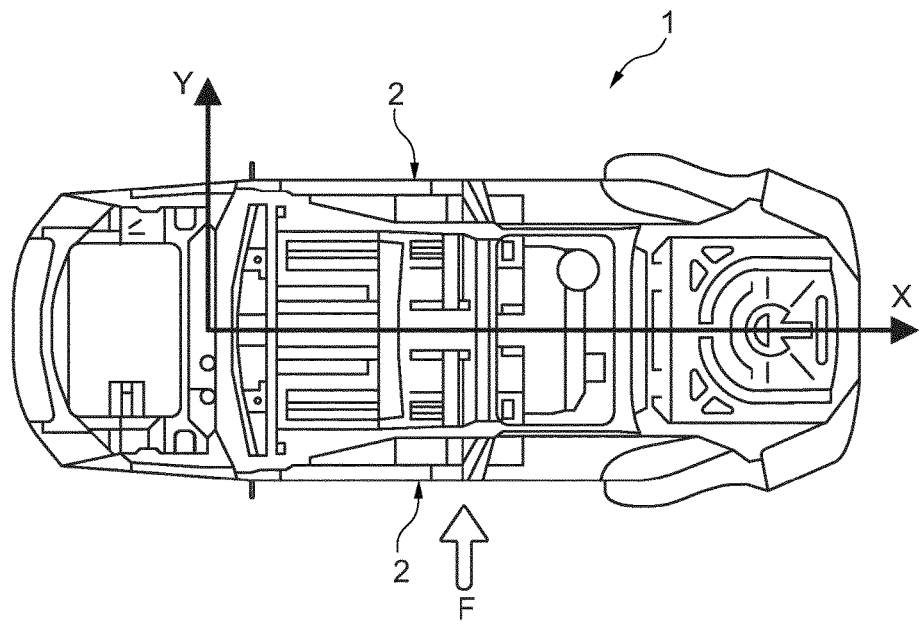
FIG. 1 shows a top view of a vehicle comprising two rockers according to an example.
Figure 2:
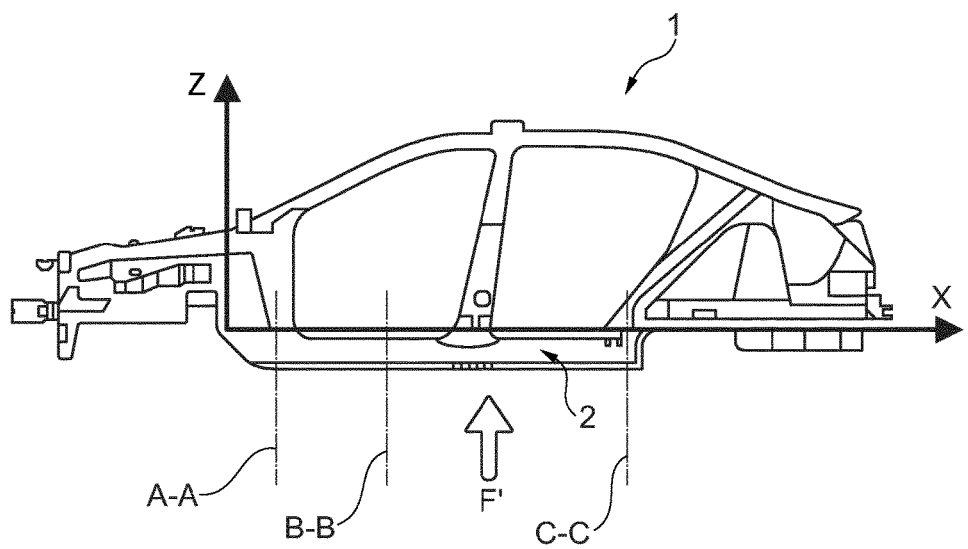
FIG. 2 shows a side view of the vehicle shown in FIG. 1 in which a rocker according an example is shown.

As shown in FIGS. 1 and 2, a vehicle 1 according to the present disclosure may comprise:
- a main elongation axis X along which the length of the vehicle 1 may extend;
- a width axis Y along which the width of the vehicle 1 may extend;
- a height axis Z along which the height of the vehicle 1 may extend.

The vehicle 1 may also comprise two rockers 2, which may be situated underneath the doors of the vehicle 1. The rockers 2 may comprise a length extending along the main elongation axis X, a width extending along the width axis Y, and a height extending along the height axis Z.

The vehicle 1 may also comprise an upper portion and a lower portion. In a normal working position, the vehicle 1 may comprise a roof arranged on the upper portion of the vehicle 1, and the rockers 2 may be situated in the lower portion of the vehicle 1.

The rockers 2 may further comprise a lower portion 101 and an upper portion 102. When the vehicle 1 is in a normal working position, the lower portion 101 of the rockers 2 may be oriented towards the ground, whilst the upper portion 102 of the rockers 2 may be oriented towards the roof of the vehicle 1.

As shown in FIGS. 3a and 3b, the rocker 2 may comprise:
- a central core 3 that may comprise a length extending along the main elongation axis X, a width extending along the width axis Y, and a height extending along the height axis Z;
- two hollow units 4 and 5 that may extend along the length of the central core 3 and may be arranged on one side 103 and the other 104 of the central core 3 such that unit 4 may be closer to the outside of the vehicle 1 than unit 5, and such that a cross-section of the units 4, 5 in the main elongation axis X may form a closed polygon on the length of the central core. The units may comprise a length extending along the main elongation axis X, a width extending along the width axis Y, and a height extending along the height axis Z; and
- two flanges 6, 6' that may project from the lower portion 101 and from the upper portion 102 of the rocker 2, such that the rocker 2 may be assembled with other elements of the bodywork of the vehicle 1

The sum of the height of the two units 4 and 5 may be not more than the height of the central core 3 that separates the two flanges 6, 6' such that the units 4 and 5 do not overlap along the height axis Z.

The unit 4 that may be arranged closest to the outside of the vehicle 1 may be situated closer to the upper portion of the vehicle than the unit 5.

Each unit 4 and 5 may be formed by several walls. More specifically, each unit 4 and 5 may comprise:
- at least one upper wall 41, 42, 51, 52, which may be a wall transversal to the central core 3 and to the height axis Z and which may form part of the unit 4 or 5 closest to the upper portion of the vehicle 1;
- at least one lower wall 43, 44, 53, 54, which may be a wall transversal to the central core 3 and to the height axis Z and which may form part of the unit 4 or 5 closest to the lower portion of the vehicle 1;
- at least one outer lateral wall 45, 55, which may be a wall that links the upper 42, 52 and lower 43, 53 walls and which may form part of the unit 4 or 5 closest to the outside of the vehicle 1. Alternatively, the outer lateral wall 45, 55 may be parallel to the central core 3, and/or to the height axis Z; and
- at least one inner lateral wall 46, 56, which may be a wall that links the upper 42, 52 and lower 44, 54 walls and which may form part of the unit 4 or 5 closest to the inside of the vehicle 1. Alternatively, the outer lateral wall 46, 56 may be parallel to the central core 3, and/or to the height axis Z and/or to the outer lateral wall 45, 55.

In more examples, the units 4 and 5 may each form a quadrilateral, for example any trapezoid. In yet more examples, such as the one shown in FIGS. 3a and 3b, the units 4 and 5 may each form a hexahedron. The hexahedron may have two parallel sides.

The polygons formed by the cross-section of the units 4 and 5 along the main elongation axis X shown in FIGS. 3a and 3*b* may have angled apexes. However, the units 4 and 5 of the present disclosure are not limited to this example, and the cross-section thereof along the main elongation axis X may form polygons where the apexes between the faces are rounded. Indeed, in circumstances regarding stress concentration or manufacturing constraints, it may be desirable to form rounded apexes.

When the rocker 2 is subjected to a force F directed along the width axis Y, and oriented from the outside towards the inside of the vehicle 1, the rocker 2 may bend towards the inside of the vehicle 1. During this bending, the rocker 2 may be divided into two different areas separated by a neutral elongation axis ψ situated between the two units 4 and 5, and which may be perpendicular to the force F. A first area may be subjected to compression, whilst a second area may be subjected to tension.

The neutral elongation axis ψ may be situated between the units 4 and 5 such that at least 80% of the unit 4 may be situated in the first area 110 and may work in compression, and at least 80% of the unit 5 may situated in the second area 112 and may work in tension.

When the rocker is subjected to a force F' extending along the height axis Z, and oriented from the lower portion towards the upper portion of the vehicle 1, the rocker 2 may bend towards the upper portion of the vehicle 1. During this bending, the rocker may be divided into two different areas separated by a neutral elongation axis ψ' situated between the two units 4 and 5, and which may be perpendicular to the force F'. A first area 116 may be subjected to compression, whilst a second area 118 may be subjected to tension.

The neutral elongation axis ψ' may be situated between the units 4 and 5, such that at least 80% of the unit 4 may be situated in the first area and may work in compression, and at least 80% of the unit 5 may be situated in the second area and may work in tension.

In examples, for bending created by the application of a force directed along the height axis Z, the units 4 and 5 may only be situated in a single area, such that a unit 4 or 5 may only work in compression whilst the other unit may only work in tension.

When the vehicle 1 is in use, the rockers 2 may mainly be subjected to bending created by the application of forces directed along the width axis Y and the height axis Z, and mostly along the width axis Y. Thus, the fact that for these mechanical stresses, at least 80% of a unit 4 or 5 may work in compression whilst at least 80% of the other unit may work in tension enables an optimal compromise to be obtained between maximum strength of the rockers 2, energy absorption, mass and volume of the rockers 2.

Indeed, the applicant has found that if the two units both work in compression or in tension, the rocker collapses more quickly than when one unit works in compression whilst the other works in tension.

It is thus possible to manufacture a rocker that has maximum bending strength and energy absorption during the upper deformation thereof of a rocker of the state of the art, whilst having an identical mass.

Figure 4A:
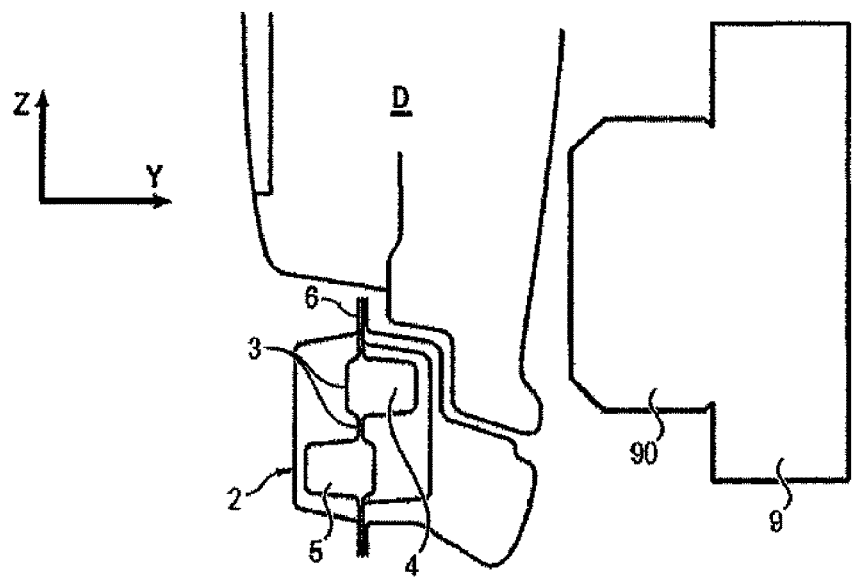
FIG. 4a shows a cross-sectional view of the vehicle comprising a door and a rocker according an example, the vehicle being about to be hit by a second vehicle.
Figure 4B:
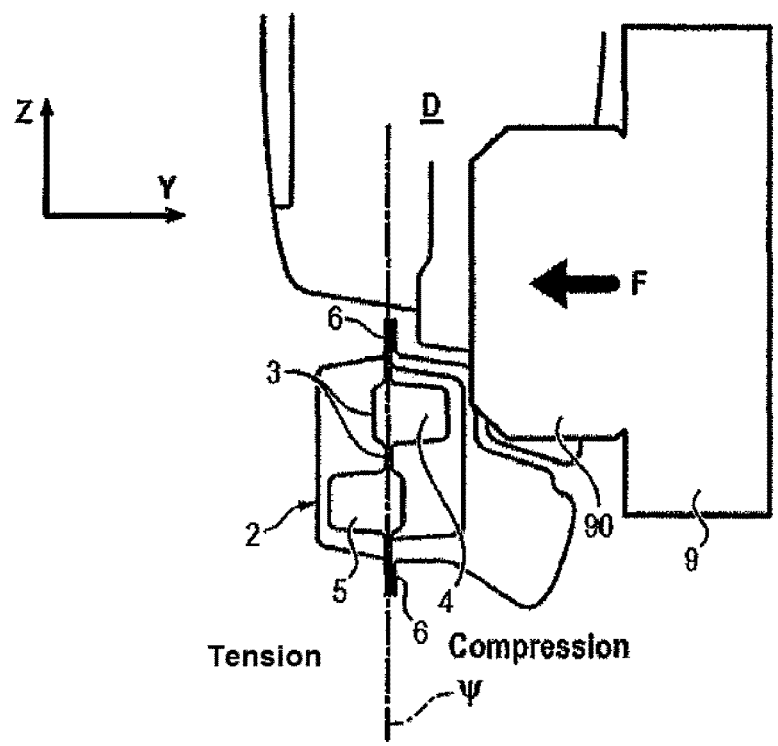
FIG. 4b shows the same view as FIG. 4a, with the second vehicle hitting the vehicle at the height of the door thereof and of the rocker.

Moreover, as shown in FIGS. 4*a* and 4*b*, the fact that the unit 4, is arranged closest to the outside of the vehicle 1 and is situated closer to the upper portion of the vehicle 1 than the unit 5, enables the penetration of a second vehicle 9 colliding against the side of the vehicle, at the height of a door D, to be limited.

Indeed, under the effect of the force applied by the second vehicle 9, and more specifically by the bumpers 90 of said second vehicle 9, the door D of the vehicle 1 may be pushed towards the inside of the vehicle 1. Since the unit 4 may be situated towards the outside and the upper portion of the vehicle 1, the door, during the deformation thereof towards the inside of the vehicle, may be limited in its deformation by unit 4. Such a limitation of the movement of the door D towards the inside of the vehicle 1 enables the inwards penetration of said vehicle 1 to be limited, which is an important security factor.

Figure 4C:
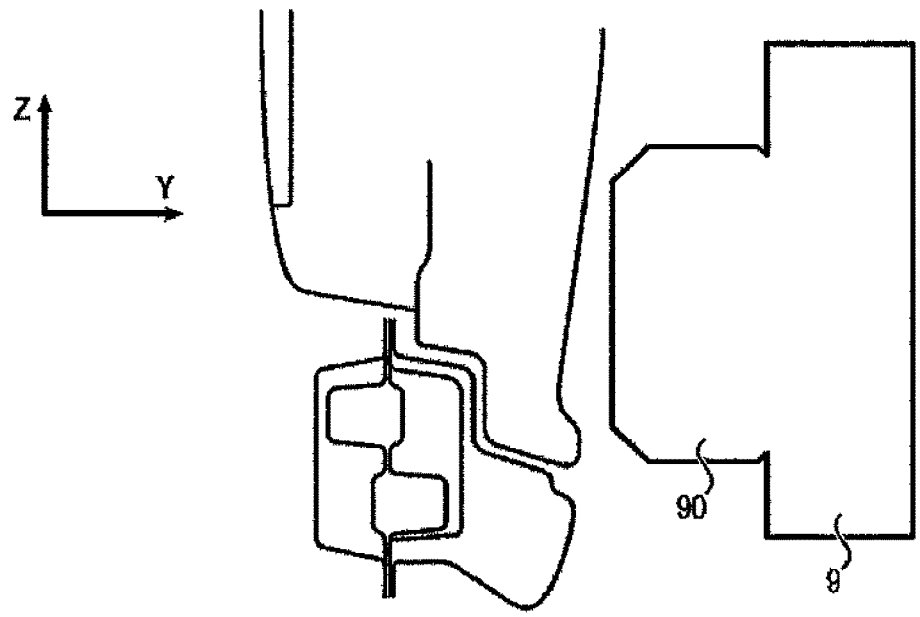
FIG. 4c shows a cross-sectional view of a vehicle comprising a door and a rocker that is not falling under the present disclosure, the vehicle being about to be hit by a second vehicle.
Figure 4D:
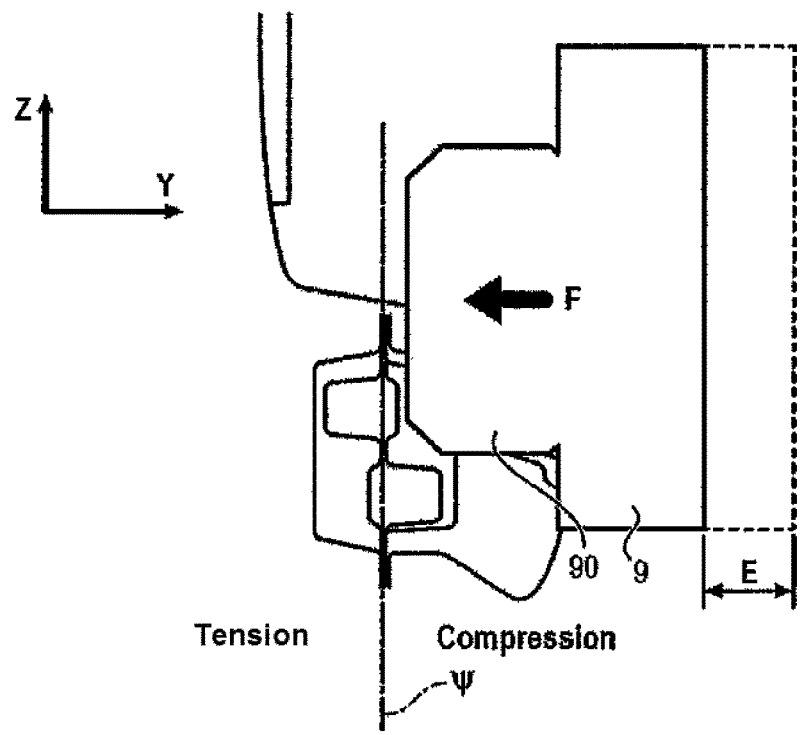
FIG. 4d shows the same view as FIG. 4c, with the second vehicle hitting the vehicle at the height of the door thereof and of the rocker.

As shown in FIGS. 4*c* and 4*d*, if the unit 4 was not in this position, for example, being situated closer to the inside of the vehicle, the penetration of the door towards the inside of the vehicle would be greater since the door would be limited in the deformation thereof towards the inside of the vehicle 1 only later. Indeed, as may be seen in FIG. 4*d*, there is a gap E between the distance at which the second vehicle 9 starts to be limited in the penetration thereof, and more specifically the bumpers 90, when the unit 4 is situated towards the outside and the upper portion of the vehicle 1, and when it is not.

The upper portion of the rockers 2 of a vehicle 1 may indeed be situated, in most cases, at the same level as the bumpers 90 of the second vehicle 9 (this effectively varies depending on the model of the vehicle 1 and the second vehicle 9).

Figure 5:
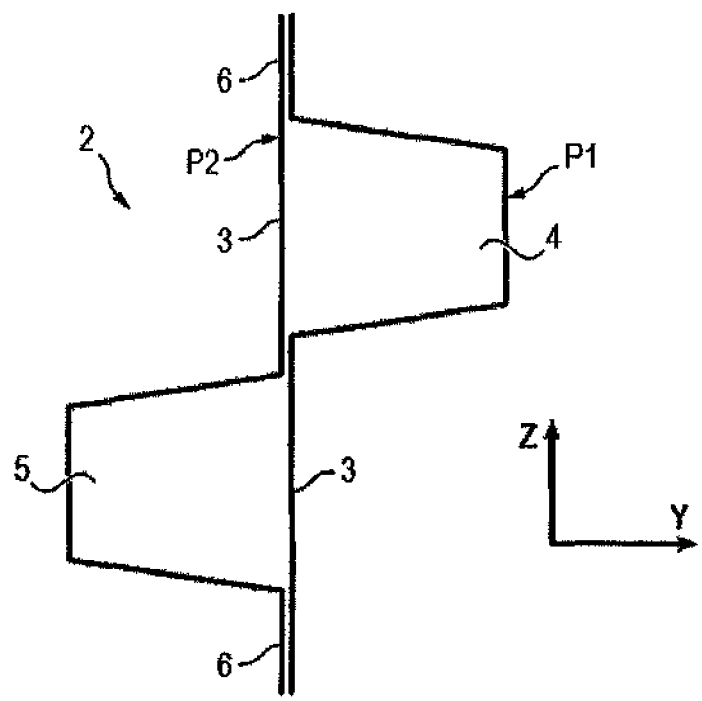
FIG. 5 shows a cross-sectional view along a main elongation axis of a first variant of a rocker.

The rocker 2 may be manufactured according to at least two possible variants. In a first manufacturing variant, as shown in FIG. 5, the rocker 2 may be manufactured by assembling two lateral reinforcements P1 and P2. The two reinforcements P1 and P2 may comprise hollow parts such that their assembly forms the central core 3, the two units 4 and 5, as well as the two flanges 6, 6'. In order to do so, the reinforcements P1 and P2 may each comprise at least one hollow part that is staggered along axis Z with respect to the hollow part of the other piece.

Alternatively, the pieces P1 and P2 may comprise several hollow parts, such that when the reinforcements P1 and P2 are assembled, the central core 3 is more rigid.

Figure 6:
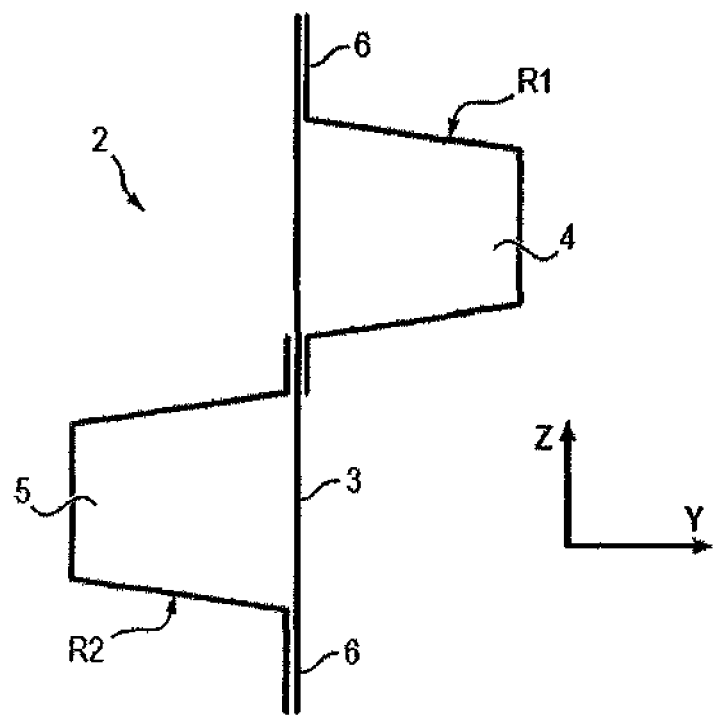
FIG. 6 shows a cross-sectional view along a main elongation axis of a second variant of a rocker.

In a second manufacturing variant, as shown in FIG. 6, the rocker 2 may be manufactured by assembling at least two reinforcements R1 and R2 on a plate that forms the central core 3 and the flanges 6, such that the units 4 and 5 are formed.

Alternatively, the reinforcements R1 and R2 may be hat-shaped reinforcements that comprise a U-shaped body and two lateral flanges, and the reinforcements R1 and R2 may be assembled to the plate forming the central core 3 through lateral flanges thereof.

Alternatively, the units 4 and 5 may each be formed by assembling two Z-shaped reinforcements.

Figure 7:
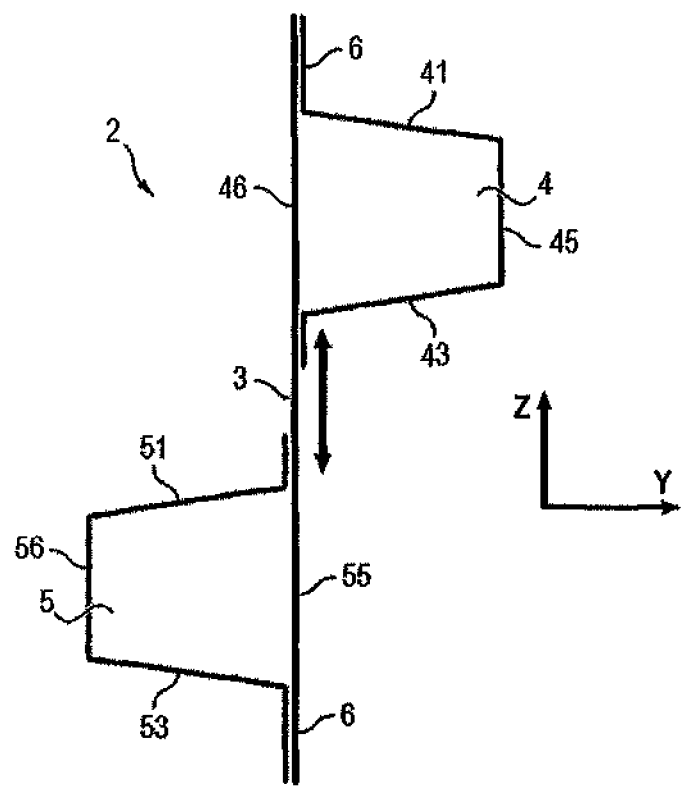
FIG. 7 shows a cross-sectional view along a main elongation axis of a rocker according to a first example.

According to a first example, as shown in FIG. 7, the units 4 and 5 may be spaced apart along the height of the central core 3. Indeed, there is a central core 3 height between the lower wall 43 of unit 4 and the upper wall 51 of unit 5.

The example shown in FIG. 7 may be carried out according to the second manufacturing variant of the rocker 2, i.e. by assembling reinforcements on a plate forming the central core 3 and the flanges 6.

However, this example may also be carried out according to the first manufacturing variant of the rocker 2, i.e. by assembling two reinforcements so as to form the central core 3, the units 4 and 5, and the flanges 6.

Figure 8:
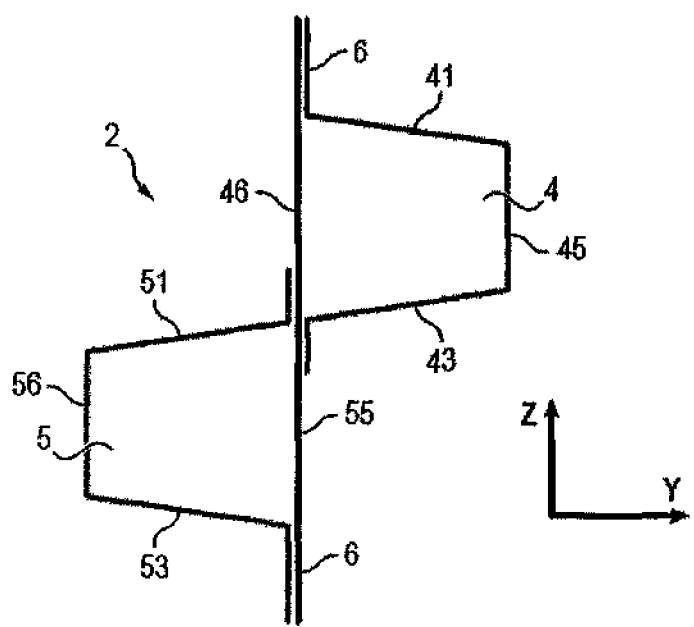
FIG. 8 shows a cross-sectional view along a main elongation axis of a rocker according to a second example.

According to a second example, as shown in FIG. 8, the units 4 and 5 may not be spaced along the height of the central core 3. Indeed, there is no central core 3 height between the lower wall 43 of unit 4 and the upper wall 51 of unit 5.

The example shown in FIG. 8 may be carried out according to the second manufacturing variant of the rocker 2, i.e. by assembling reinforcements on a plate forming the central core 3 and the flanges 6.

However, this example may also be carried out according to the first manufacturing variant of the rocker 2, i.e. by assembling two reinforcements so as to form the central core 3, the units 4 and 5, and the flanges 6.

Figure 9:
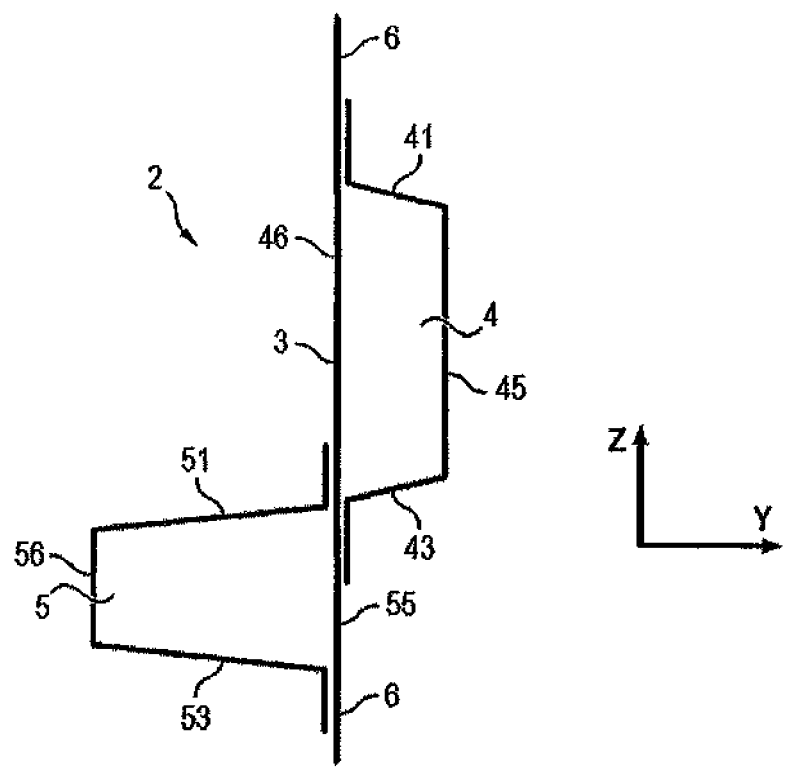
FIG. 9 shows a cross-sectional view along a main elongation axis of a rocker according to a third example.

According to a third example, as shown in FIG. 9, the units 4 and 5 may have different widths and/or heights. Indeed, the upper and lower walls 41, 43 of the unit 4 are shorter in length than the length of the upper and lower walls 51, 53 of unit 5, and the outer and inner side walls 45, 46 of unit 4 are greater in length than the length of the outer and inner walls 55, 56 of unit 5.

The height and width differences between the units 4 and 5 shown in FIG. 9 are not limiting. It may indeed be possible that, for example, that unit 5 has both a greater height and length than unit 4, or that for example unit 4 has a greater width than unit 5 but an identical height.

The example shown in FIG. 9 may be carried out according to the second manufacturing variant of the rocker 2, i.e. by assembling reinforcements on a plate forming the central core 3 and the flanges 6.

However, this example may also be carried out according to the first manufacturing variant of the rocker 2, i.e. by assembling two reinforcements so as to form the central core 3, the units 4 and 5, and the flanges 6.

Figure 10:
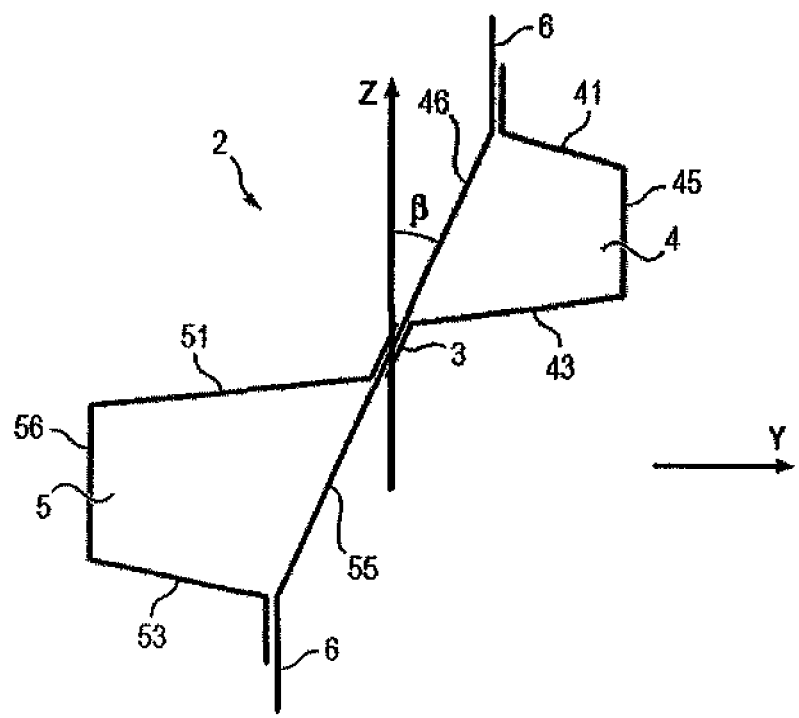
FIG. 10 shows a cross-sectional view along a main elongation axis of a rocker according to a fourth example.

According to a fourth example, as shown in FIG. 10, the central core 3 may be inclined at an angle β with respect to the height axis Z. In this example, the angle β may be comprised between 0° and 30°.

The example shown in FIG. 10 may be carried out according to the second manufacturing variant of the rocker 2, i.e. by assembling reinforcements on a plate forming the central core 3 and the flanges 6.

However, this example may also be carried out according to the first manufacturing variant of the rocker 2, i.e. by assembling two reinforcements so as to form the central core 3, the units 4 and 5, and the flanges 6.

Figure 11:
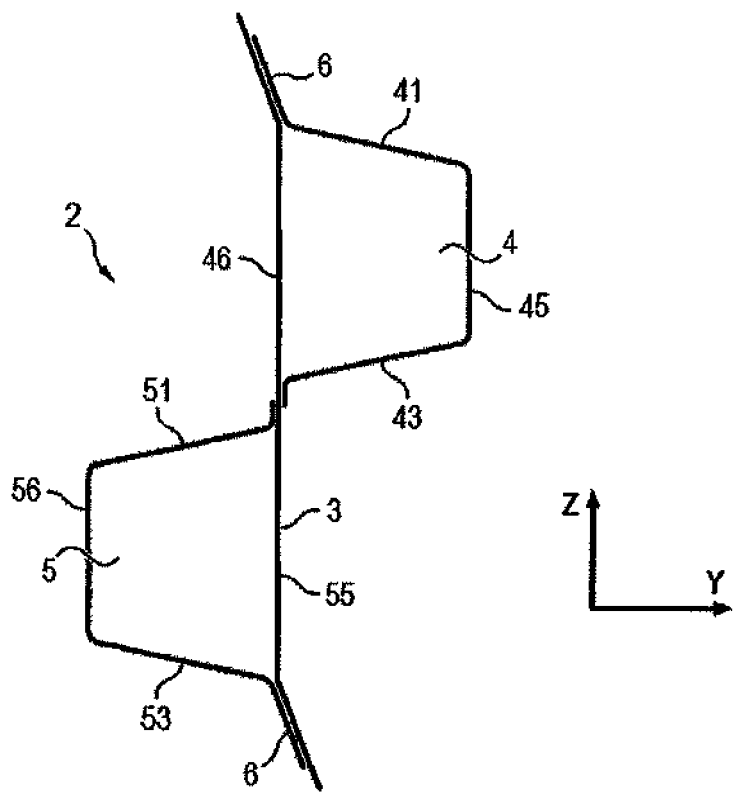
FIG. 11 shows a cross-sectional view along a main elongation axis of a rocker according to a fifth example.

According to a fifth example, as shown in FIG. 11, the flanges may be inclined with respect to the height axis Z In the example shown in FIG. 11, the flanges 6 may be parallel. However, the flanges 6 may also be not parallel. The orientation of the flanges 6 may be chosen depending on the assembly constraints of the rocker 2 to the bodywork of the vehicle 1.

The example shown in FIG. 11 may be carried out according to the second manufacturing variant of the rocker 2, i.e. by assembling reinforcements on a plate forming the central core 3 and the flanges 6.

However, this example may also be carried out according to the first manufacturing variant of the rocker 2, i.e. by assembling two reinforcements so as to form the central core 3, the units 4 and 5, and the flanges 6.

Figure 12:
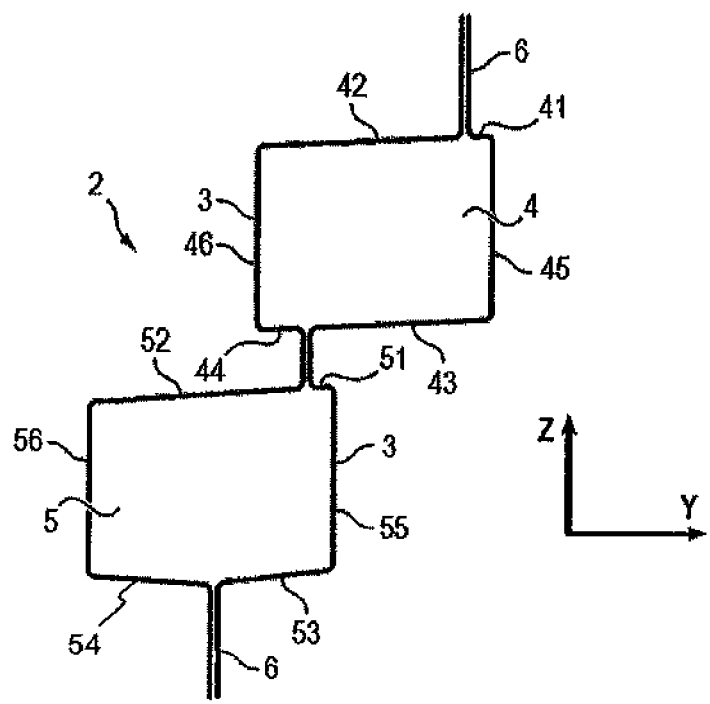
FIG. 12 shows a cross-sectional view along a main elongation axis of a rocker according to a sixth example.

According to a sixth example, as shown in FIG. 12, the flanges may be staggered along the width of the rocker 2. Indeed, in this example, the central core 3 comprises two reinforcements. In this example, each of these reinforcements comprises two arms and a bottom, one arm being longer than the other.

The example shown in FIG. 12 may be carried out according to the first manufacturing variant of the rocker 2, i.e. by assembling two reinforcements so as to form the central core 3, the units 4 and 5, and the flanges 6.

However, this example may also be carried out according to the second manufacturing variant of the rocker 2, i.e. by assembling reinforcements on a reinforced plate forming the central core 3 and the flanges 6, so as to form the units 4 and 5.

The third, fourth, fifth and sixth examples disclosed above may be combined with each other, as well as with the first or second examples disclosed above. Indeed, the first and second examples are examples that are mutually exclusive.

Figure 13:
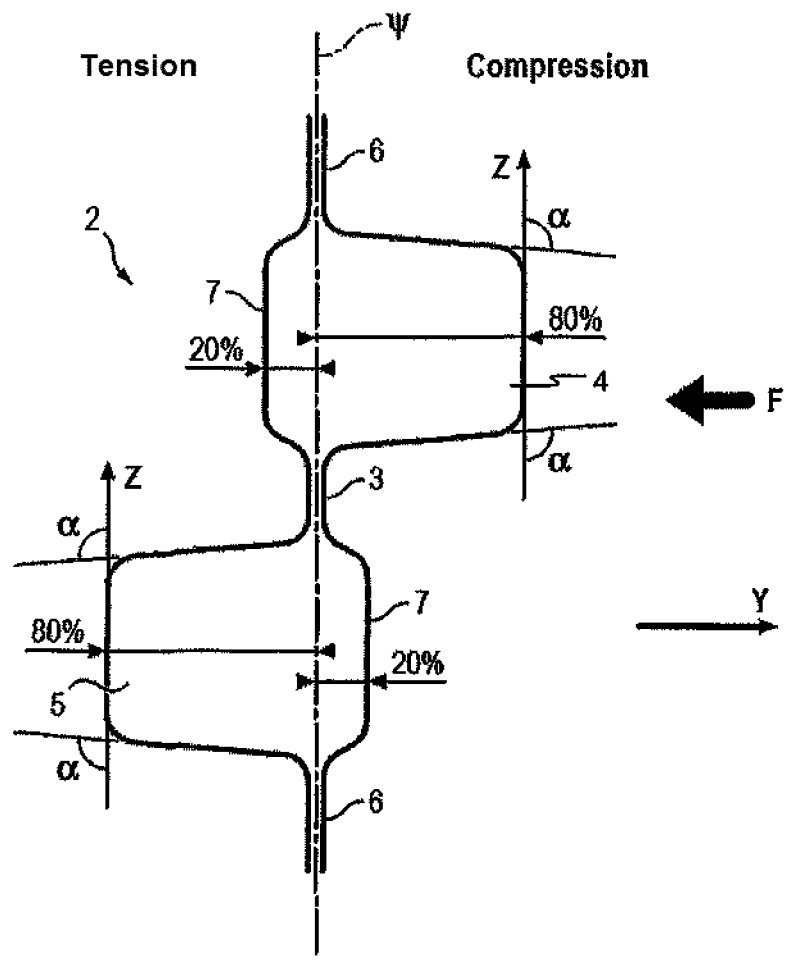
FIG. 13 shows a cross-sectional view along a main elongation axis of a rocker in order to represent particular features.

As shown in FIG. 13, the central core 3 may comprise reinforcements such that it is made more rigid. More specifically, the central core 3 comprises a lateral rib 7 situated opposite each of the units 4 and 5 along the width axis Y, the lateral rib 7 may be extending such that it projects opposite the unit 4 or 5. However, inventors have found that an enhanced compromise between mass, rigidity of the central core 3 and the fact that one unit 4 or 5 works in compression whilst the other works in tension, is obtained when the depth of the lateral rib 7 is a maximum of 20% of the width of the units 4 or 5. Thus, at least 80% of a unit 4 or 5 works in compression whilst 80% of the other unit 4 or 5 works in tension.

As shown in FIG. 13, each unit may comprise a wall that is transversal with respect to the length of the central core 3. The wall may be inclined at an angle $\alpha$ with respect to the height axis Z, the angle $\alpha$ may range between 90° and 105°.

When the value of the angle $\alpha$ is closer to 90°, the material forming any of the units 4 or 5 is further away from the neutral deformation axis $\psi$. In these cases, the material is working (either in compression or tension) if it is further away from the neutral deformation axis $\psi$, thus resisting the deformation of the rocker 2, and absorbing energy. In addition, if the angle $\alpha$ is close to 90°, this creates a segment that will be effective against resisting a force F directed along the width axis Y. Yet, such forces correspond to the main stresses to which the rocker 2 must resist, as this corresponds to the side impact of the vehicle 1 by a second vehicle.

Figure 14A:
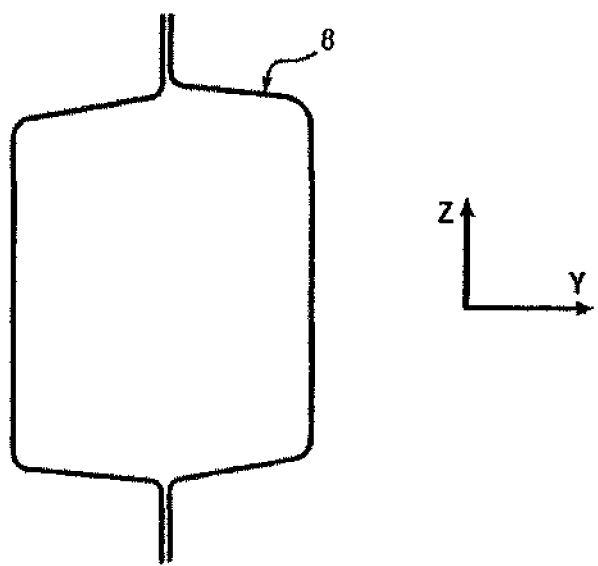
FIG. 14a represents a cross-sectional view of the rocker of FIG. 2 according to axis A-A.
Figure 14B:
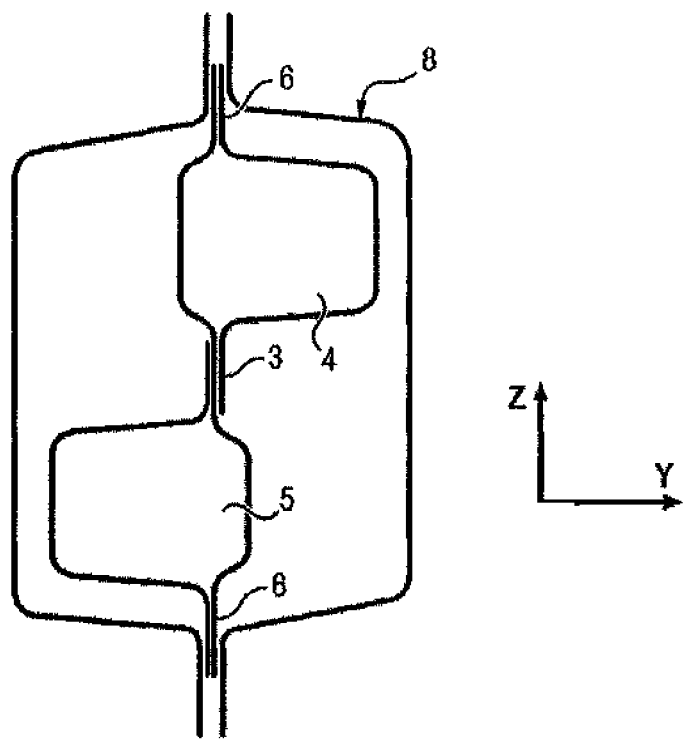
FIG. 14b represents a cross-sectional view of the rocker of FIG. 2 according to axis B-B.
Figure 14C:
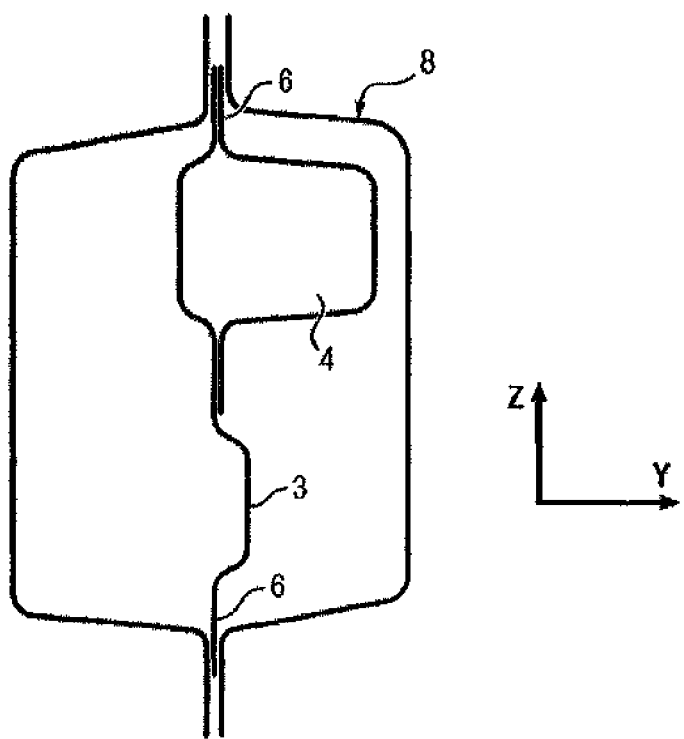
FIG. 14c represents a cross-sectional view of the rocker of FIG. 2 according to axis C-C.

FIGS. 14a, 14b, 14c are cross-sectional views along the main elongation axis X of a particular example of a rocker 2.

As shown in these views, the rocker 2 may comprise, in this example, a contour frame 8, which may be formed, as shown in these figures, by assembling two hat-shaped pieces that may be assembled together. The contour frame 8 may surround the central core 3 and the units 4 and 5, and it may be assembled with the central core 3 at the same level as the flanges 6.

As may be seen in FIG. 14a, the rocker 2 may comprise a first area on which it may only comprise the contour frame 8, without the central core 3 or the units 4 and 5. The first area may be situated on a front portion of the rocker 2.

As may be seen in FIG. 14b, the rocker 2 may comprise a second area on which the rocker 2 may comprise the contour frame 8, the central core 3 and the units 4 and 5. The central core 3 may be assembled with the contour frame 8 through the flanges 6. The second area may be situated on a central portion of the rocker 2. Alternatively, the second area may extend along the majority of the rocker 2.

As may be seen in FIG. 14c, the rocker 2 may comprise a third area on which the rocker 2 may comprise the contour frame 8, the central core 3 and only the unit 4. The central core 3 may be assembled with the contour frame 8 through the flanges 6. The third area may be situated on a rear portion of the rocker 2.

The rocker 2 may be made of metal, for example steel or aluminium. Alternatively it may be made of a composite material, for example, with an epoxy resin mould and carbon fibre reinforcements.

According to an example, according to the second manufacturing variant, the central core 3 may be made of a material with an elastic limit weaker than the material from which the reinforcements R1 and R2 that form the units 4 and 5 may be made.

Furthermore, the central core 3 may further have a thickness smaller than the thickness of the reinforcements R1 and R2.

According to an example, according to the first manufacturing variant, the pieces P1 and P2 may be manufactured by assembling two elements with different thicknesses that may be joined together, for example by laser welding. According to a possibility of this example, the two elements that form one piece P1 or P2 may be made of different materials, for example, different grades of steel.

Lastly, for all the examples, the walls that form the units 4 and 5 may include a step (level) 120, 122, such that they become more rigid.

Figure 15:
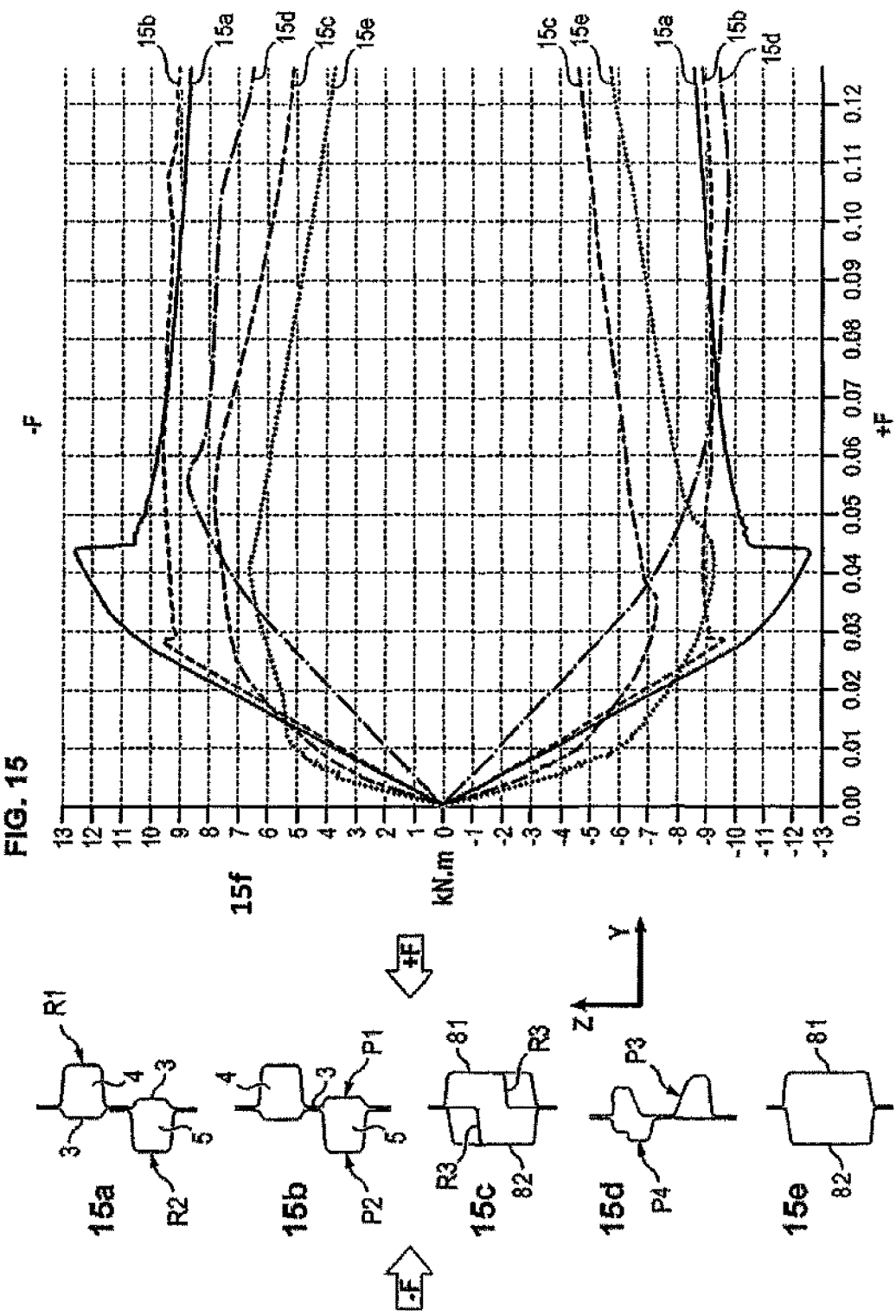
FIG. 15 represents FIGS. 15a, 15b of the examples of the rockers according to the present disclosure.

As may be seen in FIG. 15, particularly on the curves of FIG. 15*f*, which show the comparison between the performances between two examples of a rocker 2 according to the present disclosure (shown in FIGS. 15*a* and 15*b*) and three rockers according to the state of the art (shown in FIGS. 15*c*, 15*d* and 15*e*), all the rockers having the same mass, a rocker 2 according to the present disclosure having a maximum bending strength created by the application of a force directed along the width axis Y which is greater, and energy absorption that is likewise better than the rockers of the state of the art.

In order to carry out the simulations, the rocker 2 shown in FIG. 15*a* may comprise a UTS-590 steel plate (elastic limit of 390 Mpa) with a thickness of 0.8 mm which forms the central core 3, on which two 22MnB5 steel reinforcements R1 and R2 (elastic limit of 1150 Mpa) with a thickness of 1.5 mm may be assembled.

The rocker 2 shown in FIG. 15*b* may comprise two reinforcements P1 and P2 which may be assembled to form the central core 3 and the units 4 and 5. The pieces P1 and P2 may be formed by a 22MnB5 steel sheet (elastic limit of 1150 MPa) with a thickness of 1.3 mm.

The rocker shown in FIG. 15*c* may be formed by a contour frame in which reinforcements R3 may be assembled such that they form units. The contour frame may be made from the assembly of a first hat-shaped piece 81 made of UTS-590 steel (elastic limit of 390 MPa) with a thickness of 0.8 mm, and a second hat-shaped piece 82 made of 22MnB5 steel with a thickness of 0.8 mm. The reinforcements R3 may be Z-shaped reinforcements formed from a 22MnB5 steel sheet with a thickness of 1 mm. Such a rocker may correspond to a known geometry.

The rocker shown in FIG. 15*d* may be formed by the assembly of two reinforcements P3 and P4 so as to form a central core, two units and two flanges. The pieces P3 and P4 may be made from a 22MnB5 steel sheet with a thickness of 1.4 mm. Such a rocker may correspond to a known geometry.

The rocker shown in FIG. 15*e* may only be formed by a contour frame made from the assembly of a first hat-shaped piece 81 made from UTS-590 steel with a thickness of 1.2 mm, and a second hat-shaped piece made from 22MnB5 steel with a thickness of 1.4 mm. Such a rocker may correspond to a classic geometry for rockers that are well known in the state of the art.

The example shown in FIG. 15*a* may have a maximum bending strength (for bending created by a force −F directed along the width axis Y, and oriented from the inside towards the outside of the vehicle 1) which may be 90% higher at the moment of maximum bending (for force −F) than the rocker shown in FIG. 15*e*. In addition, the example shown in FIG. 15*a* may have energy absorption higher than 75% compared to the energy absorption of the rocker shown in FIG. 15*e*, for force −F.

The example shown in FIG. 15*a* may have a maximum bending strength (for bending created by a force +F directed along the width axis Y, and oriented from the outside towards the inside of the vehicle 1) which may be 36% higher at the moment of maximum bending (for force +F) than the rocker shown in FIG. 15*e*. In addition, the example shown in FIG. 15*a* may have energy absorption higher than 20% compared to the energy absorption of the rocker shown in FIG. 15*e*, for force +F.

Although only a number of examples have been disclosed herein, other alternatives, modifications, uses and/or equivalents thereof are possible. Furthermore, all possible combinations of the described examples are also covered. Thus, the scope of the present disclosure should not be limited by particular examples, but should be determined only by a fair reading of the claims that follow.

The invention claimed is:

1. A vehicle comprising a rocker of a central underbody, the vehicle and the rocker comprising
    a main elongation axis, a width axis and a height axis, a lower portion and an upper portion, the rocker further comprising:
        a central core comprising a length extending along the main elongation axis and a height extending along the height axis;
        two hollow units extending along the length of the central core and arranged on one side and the other of the central core such that one of the units is closer to an outside of the vehicle than the other unit, and such that a cross-section of the units, in the main elongation axis, forms a closed polygon on the length of the central core;
        two flanges projecting from the lower portion and upper portion of the rocker; wherein
        the units comprise a height extending along the height axis, and the sum of the height of the two units is not more than the height of the central core that separates the two flanges;
        the rocker is adapted such that, when it is subjected to bending created by application of a force extending along the width axis or the height axis, it comprises a neutral elongation axis situated between the two units and which delimits a first area of the rocker that is subjected to tension and a second area of the rocker that is subjected to compression, and at least 80% of one of the units is situated in the first area and at least 80% of the other unit is situated in the second area;
        the unit that is arranged closest to an outside of the vehicle is situated closer to an upper portion of the vehicle than the other unit.

2. The vehicle according to claim 1, wherein each unit comprises a wall that is transverse to the length of the central core, the wall being inclined at an angle comprised between 90° and 105° relative to the height axis.

3. The vehicle according to claim 1, wherein each unit is formed by assembling a reinforcement with the central core.

4. The vehicle according to claim 3, wherein the reinforcements assembled with the central core have a higher elastic limit than that of the central core.

5. The vehicle according to claim 1, wherein the rocker includes two lateral reinforcements so as to form the central core, the two units and the flanges.

6. The vehicle according to claim 1, wherein the central core comprises reinforcements such that it is more rigid.

7. The vehicle according to claim 6, wherein the central core comprises a lateral rib situated opposite each of the units along the width axis, the lateral rib being extending so as to project opposite the unit.

8. The vehicle according to claim 1, wherein the whole of one unit is situated in the first area, and the whole of the other unit is situated in the second area.

9. The vehicle according to claim 1, wherein the units are identical in shape.

10. The vehicle according to claim 1, wherein the units are different in shape.

11. The vehicle according to claim 1, wherein the units comprise steps.

12. A rocker of a vehicle; the rocker comprising:
- a central core comprising a length extending according to the main elongation axis and a height extending along the height axis;
- two hollow units extending along the length of the central core and arranged on one side and the other of the central core, such that one unit is closer to an outside of the vehicle than the other unit, and a cross-section of the units, in the main elongation axis, forms a closed polygon on the length of the central core;
- two flanges projecting from the lower portion and the upper portion of the rocker.

* * * * *